US011619370B2

(12) United States Patent
Chatten et al.

(10) Patent No.: US 11,619,370 B2
(45) Date of Patent: Apr. 4, 2023

(54) PIVOT DEVICE FOR A NAVIGATION LIGHT

(71) Applicant: Fencing Supply Group Acquisition, LLC, Dunwoody, GA (US)

(72) Inventors: Andrew F. Chatten, Elburn, IL (US); Ted J. Fiock, Elburn, IL (US)

(73) Assignee: Fencing Supply Group Acquisition, LLC, Dunwoody, GA (US)

( * ) Notice: Subject to any disclaimer, the term of this patent is extended or adjusted under 35 U.S.C. 154(b) by 567 days.

(21) Appl. No.: 16/658,668

(22) Filed: Oct. 21, 2019

(65) Prior Publication Data
US 2020/0124258 A1 Apr. 23, 2020

Related U.S. Application Data

(60) Provisional application No. 62/748,496, filed on Oct. 21, 2018.

(51) Int. Cl.
*F21V 21/26* (2006.01)
*F16M 11/10* (2006.01)
*F16M 11/18* (2006.01)
*F16H 19/08* (2006.01)
*F21W 111/04* (2006.01)
*G08B 5/36* (2006.01)
*G08G 3/02* (2006.01)

(52) U.S. Cl.
CPC ............. *F21V 21/26* (2013.01); *F16H 19/08* (2013.01); *F16M 11/105* (2013.01); *F16M 11/18* (2013.01); *F16M 2200/021* (2013.01); *F16M 2200/024* (2013.01); *F16M 2200/041* (2013.01); *F21W 2111/04* (2013.01); *G08B 5/36* (2013.01); *G08G 3/02* (2013.01)

(58) Field of Classification Search
CPC ....................................... F21V 21/26
See application file for complete search history.

(56) References Cited

U.S. PATENT DOCUMENTS

2014/0217906 A1* 8/2014 Vo .......................... H05B 47/19
315/149

FOREIGN PATENT DOCUMENTS

WO WO-2005022023 A1 * 3/2005 ............. F16M 11/00

* cited by examiner

*Primary Examiner* — Joseph L Williams
(74) *Attorney, Agent, or Firm* — McDermott Will & Emery LLP (57) ABSTRACT

A device for pivoting a navigation light and methods that use the device can include a mount assembly with an attachment for attaching the device to a structure. A pivot assembly can be supported by the mount assembly, with the pivot assembly mechanically coupled to a drive element such that a drive of the drive element pivots a navigation light to one or more operating, service, or hold positions.

15 Claims, 7 Drawing Sheets

PIVOT DEVICE FOR A NAVIGATION LIGHT

CROSS-REFERENCE TO RELATED APPLICATIONS

This application claims the benefit of and priority to U.S. Provisional Patent Application No. 62/748,496 entitled "PIVOT DEVICE FOR A NAVIGATION LIGHT" filed on Oct. 21, 2018, which is expressly incorporated by reference as if fully set forth herein in its entirety.

BACKGROUND

A navigation light is a specific type of light that can be attached to a structure and used as a marine signal light for marking a center channel or channel margin of a waterway. Conventional navigation lights often use a swivel to allow the navigation light to be moved from a normal operating position to a service position in which a light assembly can be serviced or a lamp can be replaced. A retrieval chain attached to the navigation light facilitates an operator to raise and lower the light. Navigation lights can be unwieldy to raise, lower, and secure in position.

SUMMARY

Various embodiments of a device and method for pivoting a navigation light are described. In one embodiment, a device for pivoting a navigation light includes a mount assembly with an attachment for attaching the device to a structure. The device can include a drive assembly with a drive element. The device can also include a pivot assembly mechanically coupled to the drive element such that a drive of the drive element pivots a navigation light to an operating position, a service position, or one or more hold position. The drive element can be driven, for example, by a motor-driven tool.

The pivot assembly can include gears that are mechanically coupled to provide a braking function to secure the navigation light. For example, the drive assembly can include a worm gear in contact with a worm gear modification gear of the pivot assembly. In some embodiments, a gear ratio between the worm gear and the worm gear modification gear provides the braking function. The pivot assembly can also include a tee configured to connect to a navigation light or a counterweight that can offset a portion of a weight of the navigation light.

In other embodiments, a device for pivoting a navigation light includes a mount assembly with a cover. The device can include a pivot assembly having a gear that is mechanically coupled to an adaptor, where the adaptor is supported by the cover to allow the adaptor to rotate about a rotational center of the gear. In some examples, the adaptor connects to a tee having a first end sized and shaped to receive and secure the navigation light and a second end sized and shaped to receive and secure a counterweight.

The device can include a drive assembly having a drive element mechanically coupled to a worm gear, where a drive of the drive element pivots a navigation light to one or more operating, service, or hold position(s). In some aspects, a counterclockwise drive of the drive element pivots the navigation light in a first direction and a clockwise drive of the drive element pivots the navigation light in a second direction.

The device can include a shaft mechanically coupled to the drive element and the worm gear. The gear and the worm gear can be mechanically coupled to provide a braking function to secure the navigation light. Also, a spacer can be coupled between the adaptor and the gear. The device can also include a top enclosure that encloses the drive element. In some examples, a lockable hasp (or at least a portion of the lockable hasp) extends through the top enclosure of the device.

In another embodiment, a method of pivoting a navigation light can include attaching a mount assembly to a structure, and mechanically coupling a pivot assembly to a drive element such that a drive of the drive element can pivot a navigation light to at least one of: an operating position, a service position, or a hold position. The method can include the hold position being between 90 degrees and 180 degrees from a horizontal surface of the structure.

In some aspects of the method, providing a counterclockwise drive to the drive element can pivot the navigation light to the at least one of the service position or the hold position, and providing a clockwise drive to the drive element to pivot the navigation light to the operating position. In other aspects, providing a clockwise drive to the drive element to pivot the navigation light to the at least one of the service position or the hold position, and providing a counterclockwise drive to the f to pivot the navigation light to the operating position.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

In addition, all optional and preferred features and modifications of the described embodiments are usable in all aspects of the entire disclosure taught herein. Furthermore, the individual features of the dependent claims, as well as all optional and preferred features and modifications of the described embodiments are combinable and interchangeable with one another.

BRIEF DESCRIPTION OF THE DRAWINGS

The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Navigation lights can be attached to a structure and used as a marine signal light for marking a center channel or channel margin of a waterway. A navigation light can include a lamp inside a housing designed to protect the lamp and to provide access so the lamp can be serviced. Lamps and housings can be difficult to service in the operating position due to the navigation light being unwieldy. A swivel can allow an operator to raise and/or lower the navigation light for service, but it is not a solution to the problem of easily pivoting a navigation light toward an operating or service position, or securing the navigation light once the position has been reached. In some installations for example, an operator may have to provide more than thirty pounds of force to the retrieval chain to raise and/or lower the navigation light.

The present application relates to a pivot device that can be attached to a structure and used to suspend a navigation light below a platform of the structure. The device provides an alternative to conventional navigation lights, conventional swivels for navigation lights, conventional latches for securing navigation lights, and methods of raising and lowering a navigation light. In contrast to conventional swivels, the device described herein provides a power assist to facilitate raising and lowering a navigation light. The device described herein can be used to allow an operator to easily position a navigation light in various positions, including but not limited to, operating position, service position, and various hold positions. The device can secure the light in position.

Figure 1:
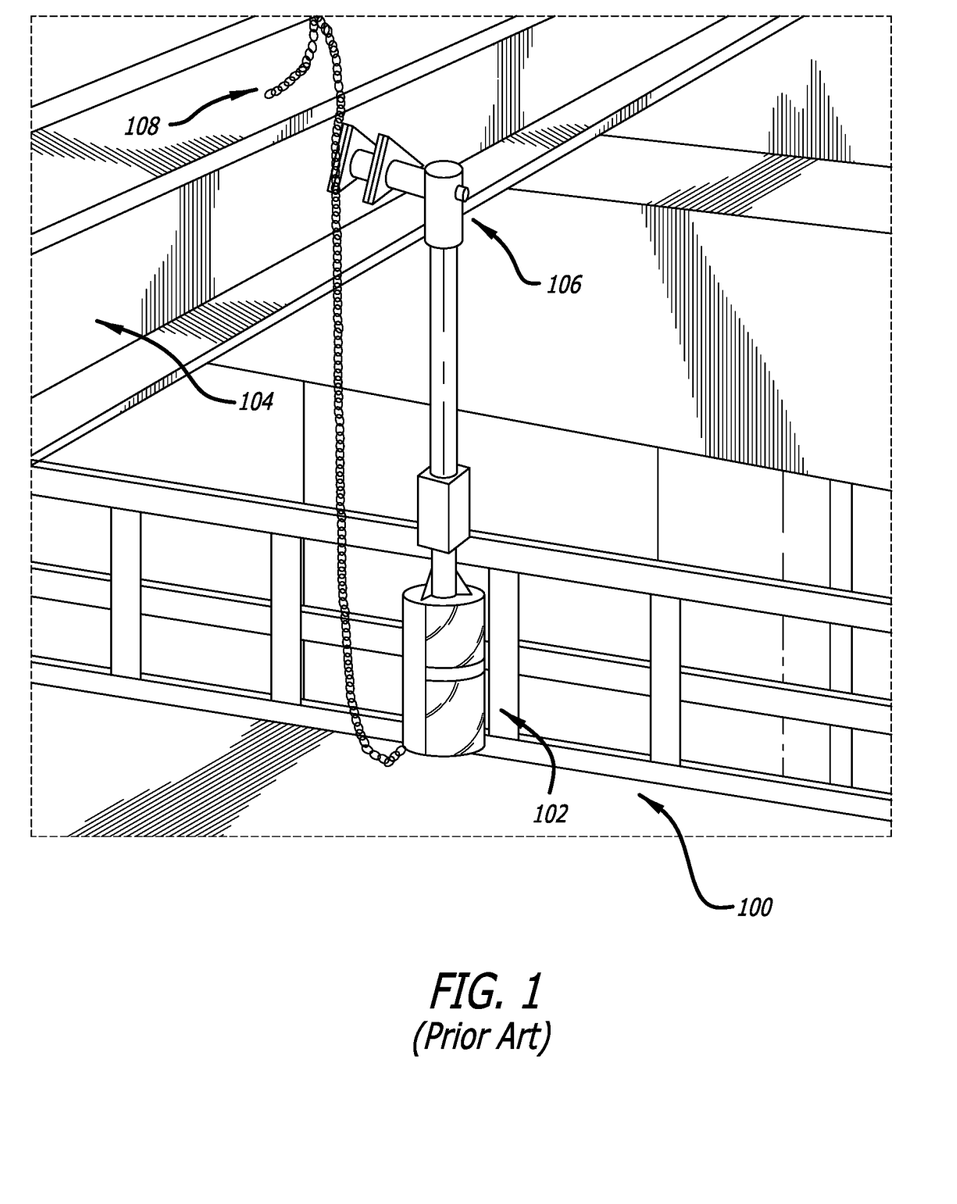
FIG. 1 illustrates problems associated with raising and lowering a navigation light using traditional methods and devices.

Turning to the drawings, FIG. 1 illustrates problems associated with raising and lowering a navigation light using traditional methods and devices. The swing arm assembly 100 includes a lamp fixture 102 that is attached to a structure 104 and suspended from a swivel component 106 on a galvanized pipe. The swing arm assembly 100 can include a weather-tight assembly that provides for all wiring to be completely contained inside the assembly. A retrieval chain 108 facilitates raising and lowering the swing arm assembly 100 for service. The retrieval chain 108 depicted is eight feet long.

The swing arm assembly 100 as depicted in FIG. 1 is in an operating position. The swing arm assembly 100 can be moved into a service position, such as to allow the lamp fixture 102 to be maintained or a lamp within the lamp fixture 102 to be replaced. Maintenance and re-lamping can be accomplished from a platform of the structure 104 by an operator pulling on the retrieval chain 108, allowing the lamp fixture 102 to swivel about the swivel component 106. As the lamp fixture 102 is raised, a latch can be manually engaged to hold the lamp fixture 102 in a service position. Such an operation has many problems including that the swing arm assembly 100 can be unwieldy to raise, lower, and secure in position.

Figure 2:
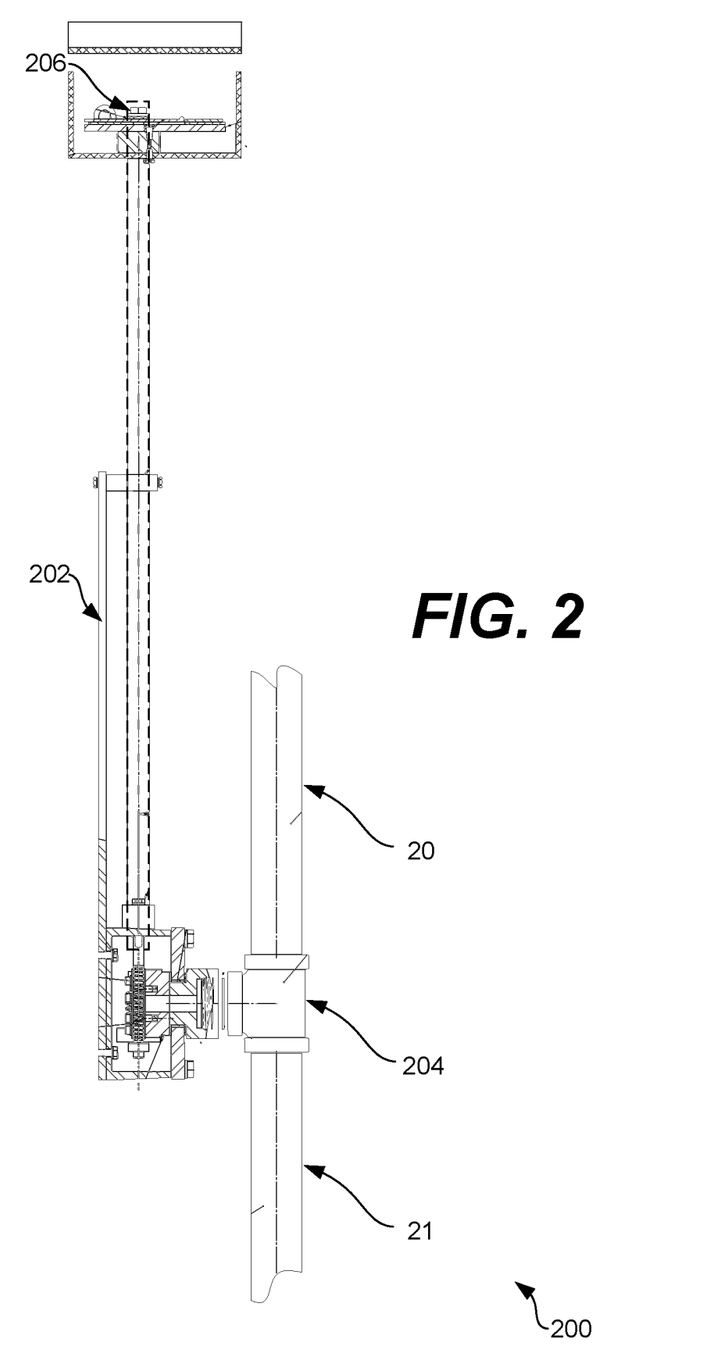
FIG. 2 illustrates an example of a device for pivoting a navigation light, in accordance with various embodiments of the present disclosure.

Referring now to FIG. 2, shown is an example of a device 200 for pivoting a navigation light. As depicted, the example device 200 includes a mount assembly 202, a pivot assembly 204, a drive assembly 206, and other components that will be described in further detail below.

In some embodiments, the mount assembly 202 can include a triangular mount, a standoff element, a mount plate, or other attachment for attaching the device 200 to a bridge or other structure 104. The mount assembly 202 can also include various other components, such as components to enclose, mount, receive, or support members of the pivot assembly 204. Adaptors, shafts, and other members of the pivot assembly 204 can be received and supported by component(s) of the mount assembly 202.

The pivot assembly 204 can include one or more discs, adaptors, gears, or other members that are coaxially aligned and mechanically coupled to rotate about a common rotational center. The drive assembly 206 can include a drive element that is configured to be driven by a motor-driven tool such as a cordless drill or air ratchet wrench. The pivot assembly 204 can be mechanically coupled to the drive element such that a drive of the drive element pivots the navigation light 21 to one or more operating, service, or hold position(s). The navigation light 21 can include a lamp assembly (not depicted) and a pipe of size and strength to suspend the navigation light 21 away from a rotational center of the pivot assembly 204.

For example, the pivot assembly 204 can include a gear and a tee that are coaxially aligned to rotate about a rotational center of the gear. The drive assembly 206 can include a drive element, a drive shaft, a worm gear, and any other component as can be appreciated. The drive shaft can be mechanically coupled to the drive element and the worm gear. The worm gear of the drive assembly 206 can be mechanically coupled to the gear of the pivot assembly 204 to allow the pivot assembly 204 to pivot the navigation light 21 to one or more operating, service, or hold position(s).

The pivot assembly 204 is also configured to be connected to a navigation light 21, and in some cases, to be connected to a counterweight 20. With reference to an operating position of the navigation light 21, the device 200 is configured to suspend the navigation light 21 below an outer-most edge of the structure so the navigation light 21 is visible to approaching vessels. A drive of the drive element can rotate the worm gear of the pivot assembly 204 and cause the navigation light 21 to pivot from its operating position to a service or hold position. Drive of the drive element be accomplished from a bridge deck, sidewalk, or other platform of the structure 104.

Figure 3:
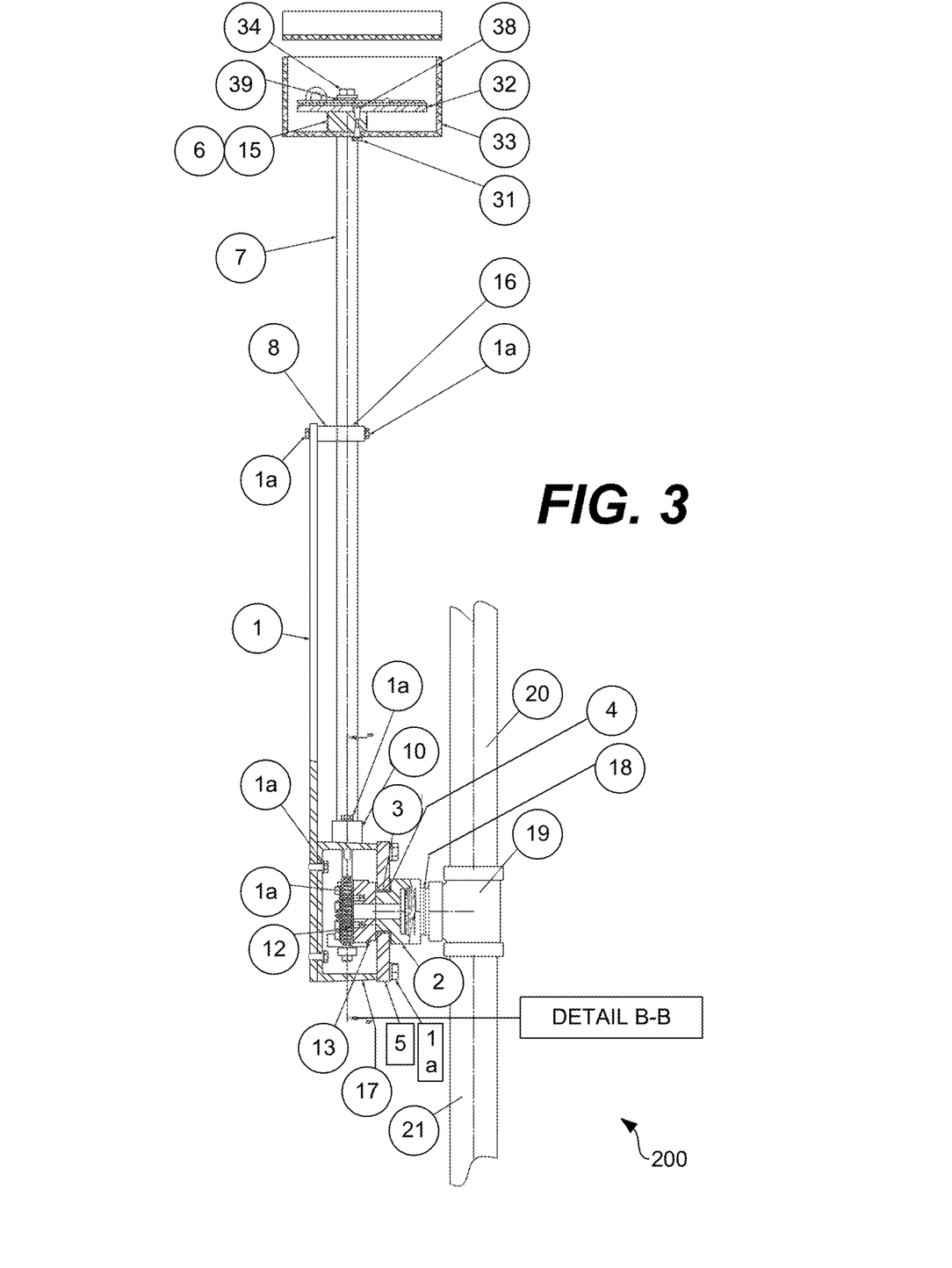
FIG. 3 illustrates an example of a device for pivoting a navigation light, in accordance with various embodiments of the present disclosure.

Moving on, FIG. 3 depicts an example of a device 200 for pivoting a navigation light 21. FIG. 3 can also be seen as depicting further examples of the mount assembly 202, the pivot assembly 204, and the drive assembly 206 of FIG. 2.

The mount assembly 202 (FIG. 2) can include a mount plate 1 that can attach the device 200 to a structure 104. The mount assembly 202 (FIG. 2) can also include a sleeve bearing 3, thrust bearing 4, cover 5, pipe spacer 8, pipe support 10, drive mount bracket 11, pipe clamp 16, a junction box 17, and/or other components as further described below.

The pivot assembly 204 (FIG. 2) can include a worm gear modification gear 12 and a tee 19 that are coaxially aligned to rotate about a rotational center of the worm gear modification gear 12. The pivot assembly 204 (FIG. 2) can also include an adaptor 2, worm gear spacer 13, close nipple 18, counterweight 20, a navigation light 21, and/or other components as further described below.

The drive assembly 206 (FIG. 2) can include a flange nut 34 or other drive element that can be driven, for example, by a motor-driven tool. The drive assembly 206 (FIG. 2) can also include a pipe cap 6, brake pipe 7, drive shaft 9, key 14, upper seal 15, hasp assembly 32, top enclosure 33, shaft collar 35, press fit drill bushing(s) 1a, worm gear 37, sleeve bearing 40, or second thrust bearing 41, as further described below and additionally with reference to FIG. 4. The device 200 can also include various washers, nuts, bolts, screws, bushings, and other fasteners 1a as can be appreciated.

Figure 4:
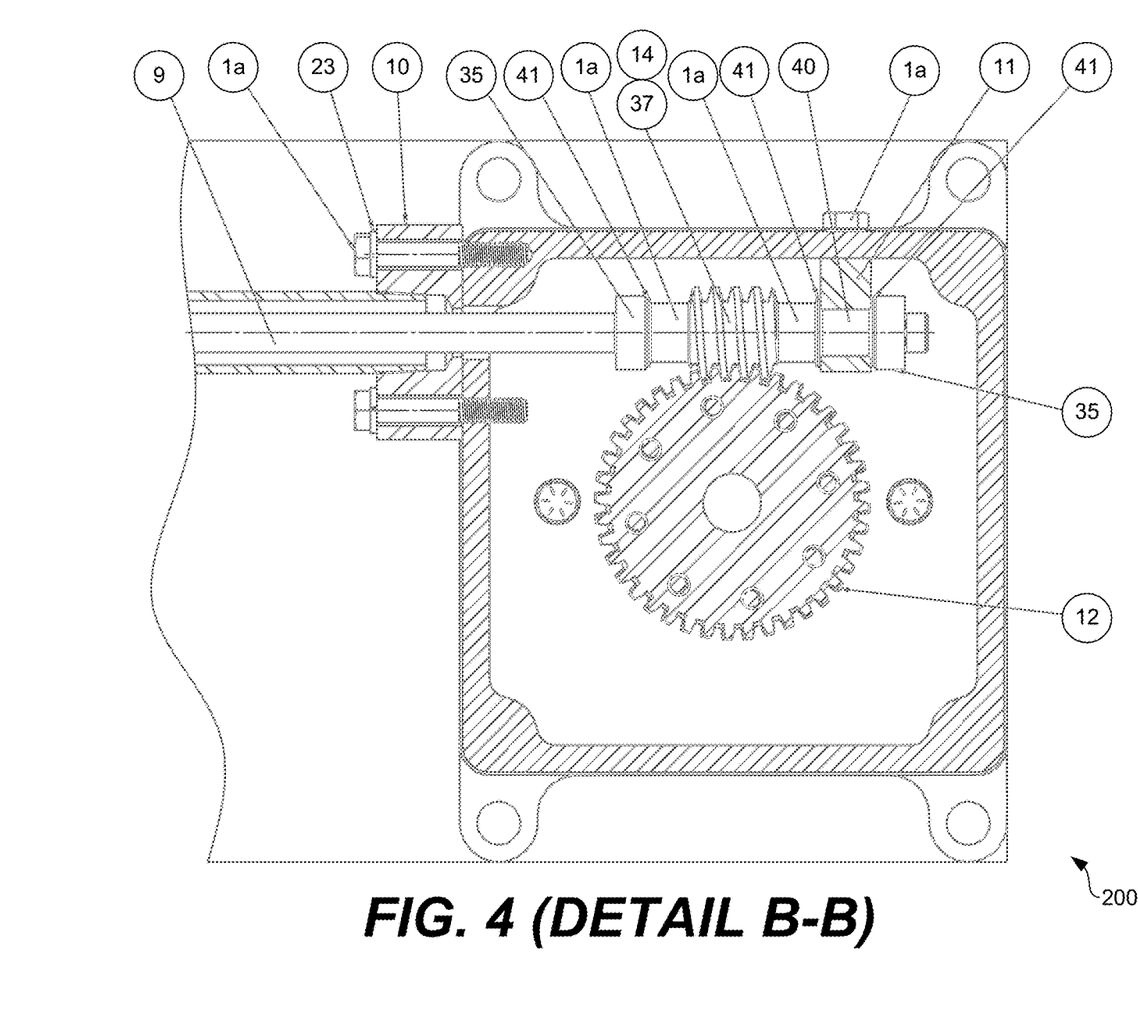
FIG. 4 illustrates an example view of a detail B-B of the device of FIG. 3 for pivoting a navigation light, in accordance with various embodiments of the present disclosure.

Still referring to FIG. 3, the flange nut 34 is mechanically coupled to a worm gear 37 (FIG. 4). The worm gear 37 (FIG. 4) is mechanically coupled to the worm gear modification gear 12 and attached to a journal of the drive shaft 9 (FIG. 4). The worm gear modification gear 12 can convert a torque and cause rotation of the tee 19. The example device 200 can also include a navigation light 21 connected to the tee 19. Rotation of the flange nut 34, such as with a motor-driven tool, can pivot the navigation light 21 from an operating position to a service or hold position.

Embodiments of the device 200 can use a 40:1 gear ratio to provide a braking function to secure the navigation light 21 in position, including but not limited to, an operating position, a service position, and one or more hold positions. The navigation light 21 can be pivoted to one or more operating, service, or hold position(s) by rotating the drive shaft 9 (FIG. 4) in either a counterclockwise or a clockwise direction.

The mount plate 1 can secure the device 200 into position such as below a platform of a bridge or other structure 104. Applying a torque to the flange nut 34 can cause rotation of the drive shaft 9 (FIG. 4). The pivot assembly 204 (FIG. 2) is connected to the drive shaft 9 (FIG. 4) to allow drive of the drive shaft 9 (FIG. 4) to rotate the tee 19. While the example device 200 as depicted in FIG. 3 includes the counterweight 20 and the navigation light 21, in some embodiments the device 200 can operate without the counterweight 20 (or the navigation light 21) connected to the tee 19.

The pipe spacer 8 spaces the brake pipe 7 from the mount plate 1, and is attached to a pipe clamp 16 that secures the brake pipe 7 in position. As mentioned previously, the pipe support 10 can support the brake pipe 7. The pipe support 10 is attached to the junction box 17. The junction box 17 is also attached to the mount plate 1 and encases components of the pivot assembly 204 or the drive assembly 206.

The junction box 17 receives the drive shaft 9 (FIG. 4) through an opening of the junction box 17 (FIG. 4). The junction box 17 can also include a cover 5 that is removably attached to the junction box 17 to allow servicing of the components within the junction box 17. The junction box 17 can be made out of any suitable material, such as, for example, solid bronze or aluminum.

The device 200 includes a top enclosure 33 that can enclose one or more of the pipe cap 6, the flange nut 34, and a portion of the hasp assembly 32. The hasp assembly 32 can include a lockable fastener, such as a hasp, that allows locking the device 200 to prevent unwanted operation of the device 200. The pipe cap 6 covers an end of the brake pipe 7 and accepts the drive shaft 9 (FIG. 4), or the flange nut 34, through an opening in the pipe cap 6. The upper seal 15 is disposed to contact the opening of the brake pipe 7 and the drive shaft 9 (FIG. 4) to protect the opening and the drive shaft 9 (FIG. 4) from weather and unwanted elements. The drive shaft 9 (FIG. 4) is coupled to the flange nut 34 allowing a rotation of the flange nut 34 to rotate the drive shaft 9 (FIG. 4). The drive shaft 9 (FIG. 4) exits through the top enclosure 33 and is encased by the brake pipe 7.

The worm gear spacer 13 spaces the worm gear modification gear 12 from the adaptor 2 and secures the worm gear modification gear 12 to the junction box 17. The worm gear modification gear 12 can transfer drive from the journal of the drive shaft 9 (FIG. 4) to the adaptor 2 and/or the tee 19. The worm gear modification gear 12 can also include various components including spacers, bushings, and shaft collars. The drive shaft 9 (FIG. 4) can include a keyway and a key 14 to maintain proper positioning of the worm gear 37 (FIG. 4). An end of the adaptor 2 is received and supported by the sleeve bearing 3 which holds the adaptor 2 in place. One or more first thrust bearing(s) 4 permit rotation between the adaptor 2 and the cover 5, or the adaptor 2 and the worm gear spacer 13, while supporting a high axial load (parallel to the close nipple 18).

A shaft of the worm gear modification gear 12 is mechanically coupled to the adaptor 2. The adaptor 2 is mounted for rotation in a sleeve bearing 3 which is mounted within the cover 5. A journal of the drive shaft 9 (FIG. 4) applies rotational power via the worm gear modification gear 12 to the close nipple 18. The close nipple 18 is attached to the adaptor 2 and mechanically connects the shaft of the worm gear modification gear 12 and the tee 19.

The tee 19 is configured to receive one or more attachments. For example, FIG. 3 depicts a counterweight 20 and a navigation light 21 attached to the tee 19. The tee 19 is attached to the close nipple 18, and as such can experience a force applied to the close nipple 18 by the shaft of the worm gear modification gear 12.

The navigation light 21 can include a pipe of a size and strength to suspend a lamp of the navigation light 21 at a length as measured from a rotational center of the worm gear modification gear 12 to a focal plane of a lens of the lamp. For example, the length from the rotational center of the worm gear modification gear 12 to the focal plane of the lens can be 6 foot 3 inches, 4 foot 10 inches, 5 foot 2 inches, or another length as can be appreciated. The counterweight 20 can include a pipe of size and strength for suspending one or more weights (not shown) from the rotational center of the worm gear modification gear 12. The one or more weights can be sufficient to offset a weight of the navigation light 21 while the navigation light 21 is being pivoted toward a service, operating, or hold position.

Referring now to FIG. 4, shown is an example view of a detail B-B of a device 200 for pivoting a navigation light 21 (FIG. 3). The pipe support 10 attaches to the junction box 17 to support the brake pipe 7 (FIG. 3) and align the worm gear 37 with the worm gear modification gear 12. The key 14 fits between the worm gear 37 and the drive shaft 9 to prevent a relative rotation and to enable a torque transmission to occur. The worm gear 37 can be mechanically coupled to the drive shaft 9 and the key 14 using press fit drill bushings or other fasteners 1a. The second thrust bearing 41 permits rotation between the fastener 1a and the shaft collar 35, or the fastener 1a and the drive mount bracket 11 and/or the sleeve bearing 40.

As depicted, the worm gear 37 includes a shaft with a spiral thread that engages with and drives the worm gear modification gear 12. The worm gear 37 can include any suitable gear such as, for example, a bevel gear, a spiral bevel gear, a hypoid gear, a crown gear, or other gear that can transfer drive 90 degrees to the worm gear modification gear 12. The worm gear 37 can also receive a force from the worm gear modification gear 12 to prevent the drive shaft 9 from rotating. There is a braking effect so that the worm gear 37 will not drive the worm gear modification gear 12 without a force being applied to the flange nut 34. For example, in some embodiments, the worm gear 37 and the worm gear modification gear 12 can together achieve a total gear ratio of about 40:1 and provide for sufficient braking effect to reduce the possibility of the drive shaft 9, or the worm gear modification gear 12, rotating without a force being applied to the flange nut 34.

Figure 5:
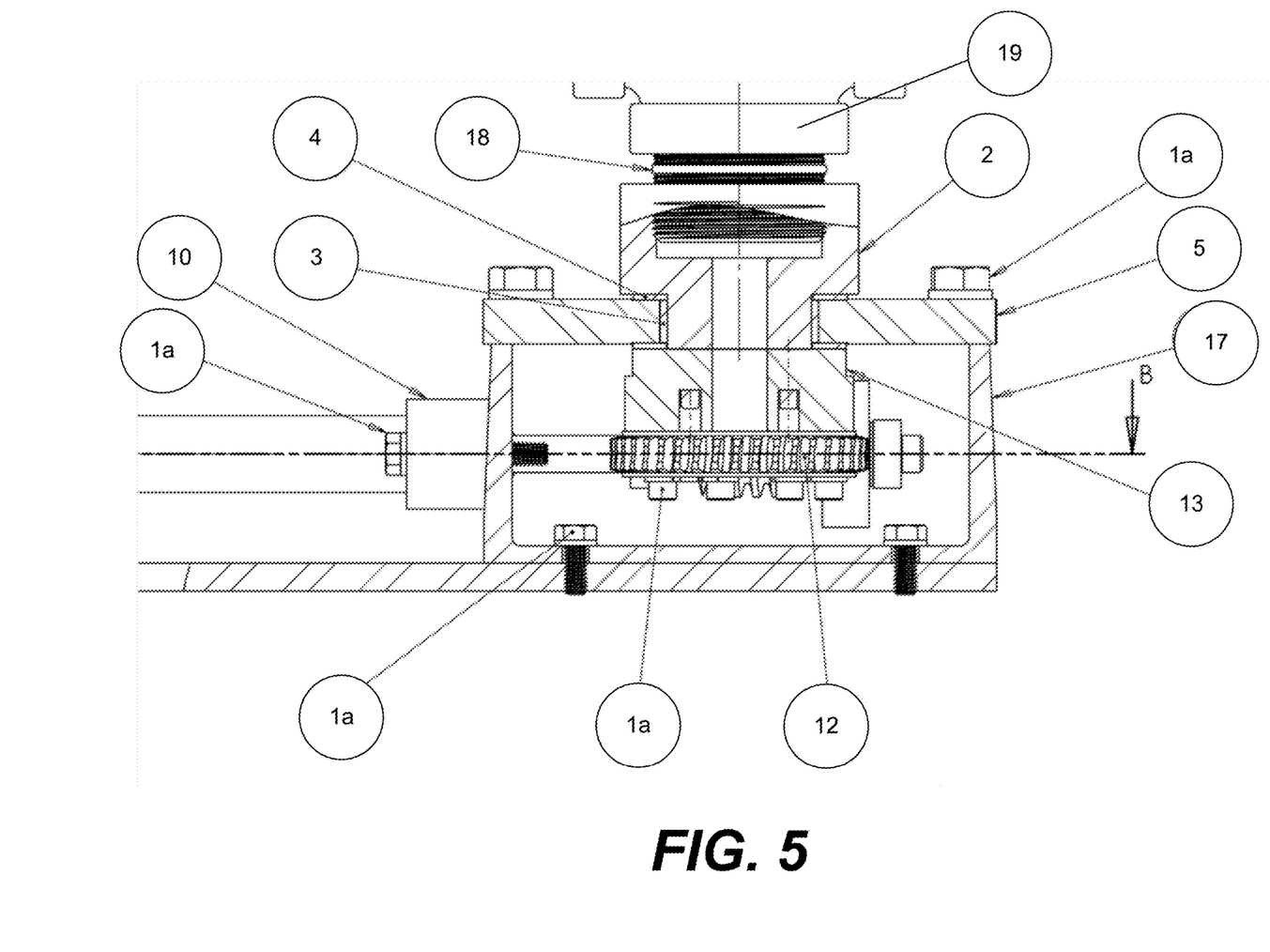
FIG. 5 illustrates a view that includes an example of a pivot assembly of a device for pivoting a navigation light, in accordance with various embodiments of the present disclosure.

In FIG. 5, an example view that includes a pivot assembly 204 of a device 200 for pivoting a navigation light 21 is shown. The pivot assembly 204 can include a worm gear modification gear 12 and a tee 19 that are coaxially aligned to rotate about a rotational center of the worm gear modification gear 12. The pivot assembly 204 can also include an adaptor 2, worm gear spacer 13, close nipple 18, and/or other components as can be appreciated. In some embodiments, the device 200 can include a counterweight 20 or a navigation light 21.

Figure 6:
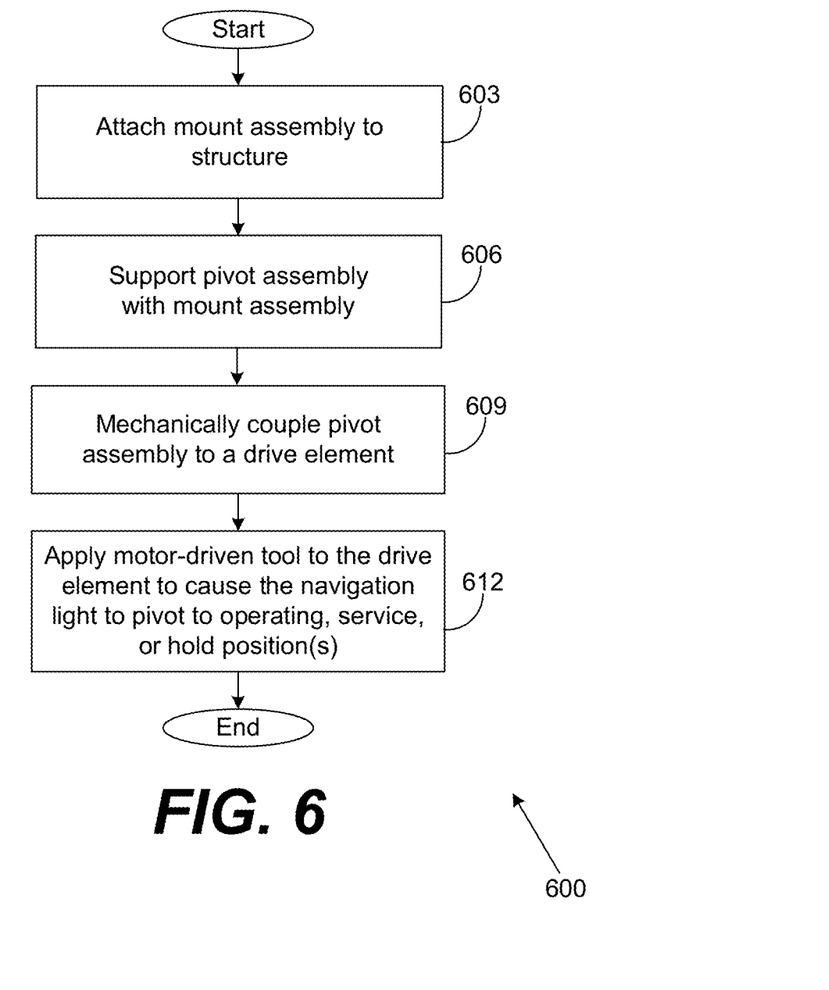
FIG. 6 is a flowchart illustrating one example method for pivoting a navigation light, in accordance with various embodiments of the present disclosure.

Referring now to FIG. 6, depicted is a flowchart illustrating an example of a method 600 of pivoting a navigation light 21. Although the method 600 is described below as being conducted using the device 200 shown in FIGS. 2-5, other devices similar to the device 200 can be used. A method 600 begins at step 603 by attaching an attachment such as a mount plate 1, other element of the mount assembly 202, or other element of the device 200 to a structure 104. The method 600 continues at step 606 by supporting a pivot assembly 204 with the mount assembly 202 such that the pivot assembly 204 can pivot the navigation light 21 to one or more operating, service, or hold position(s).

The method 600 continues at step 609 by mechanically coupling the pivot assembly 204 to a flange nut 34 or other drive element of the drive assembly 206. Thereafter the method can end. Additionally, the method can continue to step 612.

At step 612, the method 600 can include applying a motor-driven tool 36 to the flange nut 34 (or other element of the device 200) to cause the navigation light 21 to pivot. The method 600 can also include attaching a counterweight 20 and the navigation light 21 to the device 200. Thereafter the method can end.

Figure 7A:
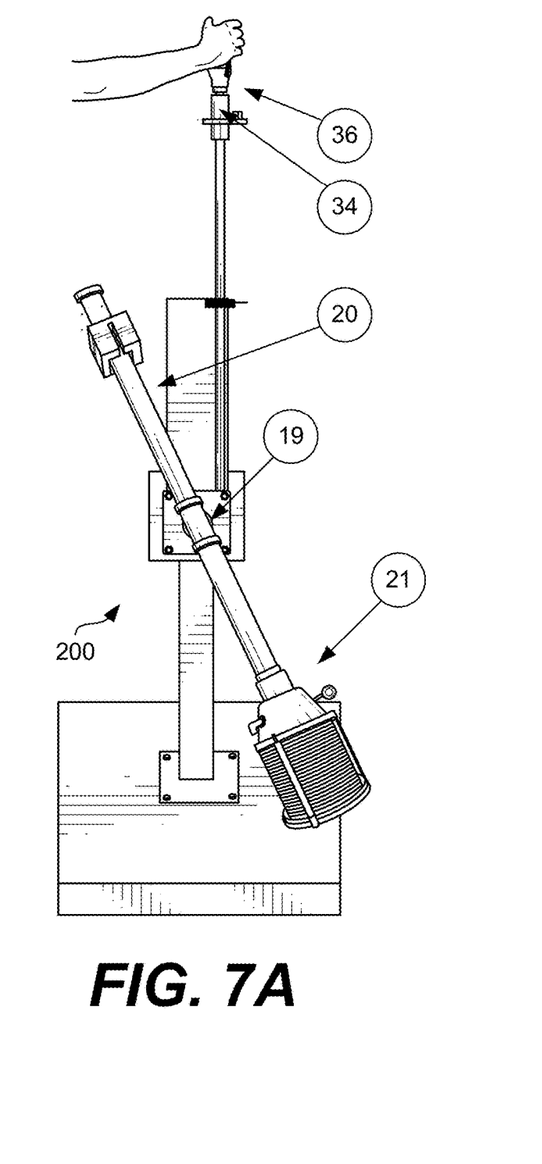
FIG. 7A illustrates an example of a device for pivoting a navigation light in a service or hold position, in accordance with various embodiments of the present disclosure.

FIG. 7A illustrates an example of a device 200 for pivoting a navigation light 21 in a service or hold position. FIG. 7A depicts the device 200 in a position where the counterweight 20 is above the navigation light 21 and able to offset at least a portion of the weight of the navigation light 21. An operator can apply a force to the flange nut 34 using a motor-driven tool 36. In some embodiments, the motor-driven tool 36 can be a power drill driver with a ¾" socket to provide for a power assisted pivoting of the navigation light 21. The flange nut 34 can be configured to be rotated in a forward or clockwise direction by the motor-driven tool 36. As the force is applied to the flange nut 34, the flange nut 34 drives the drive shaft 9 (FIG. 4) and the worm gear 37 to provide to provide for a power assisted pivoting of the navigation light 21. The worm gear 37 (FIG. 4) applies rotational power via the worm gear modification gear 12 (FIG. 3) to the close nipple 18 (FIG. 3). As a result of the drive, the tee 19 has rotated to pivot the navigation light 21 from an operating position toward a service position or hold position.

Figure 7B:
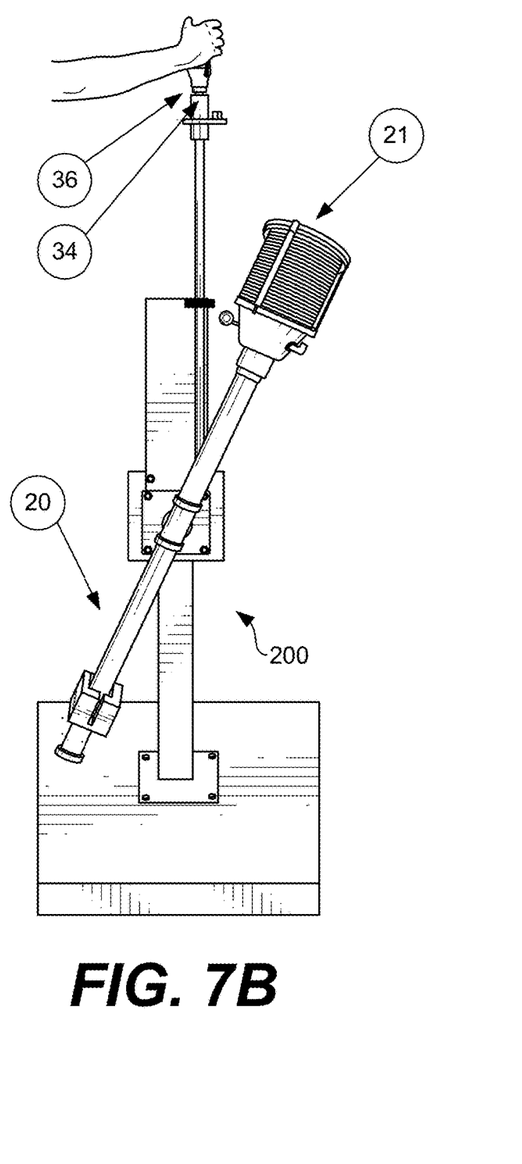
FIG. 7B illustrates another example of a device for pivoting a navigation light in a service or hold position, in accordance with various embodiments of the present disclosure.

Turning now to FIG. 7B, shown is another example of a device for pivoting a navigation light 21 in a service or hold position. FIG. 7B depicts the device 200 in a position where the counterweight 20 is below the navigation light 21. An operator can apply a force to the flange nut 34 using a motor-driven tool 36 to provide for a power assisted pivoting of the navigation light 21. The motor-driven tool 36 can cause the flange nut 34 to rotate in a forward or clockwise direction, which can cause the drive shaft 9 (FIG. 4) to rotate, and the navigation light 21 to pivot, or raise, in a counter-clockwise direction toward the service or hold position. From the service or hold position, the navigation light 21 can be pivoted, or lowered, back to its operating position by rotating the drive shaft in a counterclockwise direction or by continuing to rotate the drive shaft in a clockwise direction.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. In addition, all optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another.

The device 200 can be formed from any suitable type(s) of materials to meet or exceed U.S. Coast Guard Bridge Administration General Construction Requirements and/or other design specifications. The device 200 can be assembled by hand, or by machine, from aluminum or bronze castings combined with stainless steel hardware, from galvanized steel, or in other ways as can be appreciated. Because the device 200 can be configured to raise or lower a light in a marine environment, they can include gaskets and o-rings to provide a weather-tight assembly. Also, the device 200 can be represented by a BIMobject® object information or file that can be manipulated by a computer-aided design program.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, the following is claimed:

1. A device for pivoting a navigation light, comprising:
    a mount assembly comprising a cover;
    a pivot assembly comprising a gear mechanically coupled to an adaptor, wherein a spacer is positioned between the adaptor and the gear, the adaptor supported by the cover to allow the adaptor to rotate about a rotational center of the gear; and
    a drive assembly comprising a drive element mechanically coupled to a worm gear, the worm gear mechanically coupled to the gear to allow the pivot assembly to pivot a navigation light to at least one of: an operating position, a service position, or a hold position in response to a drive of the drive element.

2. The device according to claim 1, wherein the drive element is configured to be driven by a motor-driven tool.

3. The device according to claim 1, wherein the pivot assembly further comprises a tee configured to connect to the navigation light.

4. The device according to claim 1, wherein the pivot assembly further comprises a counterweight that offsets at least a portion of a weight of the navigation light in the at least one of: the service position or the hold position.

5. The device according to claim 1, wherein the adaptor connects to a tee having a first end sized and shaped to receive and secure the navigation light and a second end sized and shaped to receive and secure a counterweight.

6. The device according to claim 1, wherein a counterclockwise drive of the drive element pivots the navigation light in a first pivot direction and a clockwise drive of the drive element pivots the navigation light in a second pivot direction.

7. The device according to claim 1, wherein the drive element is mechanically coupled to the worm gear by a shaft.

8. The device according to claim 1, further comprising a top enclosure that encloses the drive element.

9. The device according to claim 8, wherein a lockable fastener extends through the top enclosure.

10. The device according to claim 1, wherein the mechanical coupling of the gear and the worm gear provide a braking function to secure the navigation light.

11. A method of pivoting a navigation light, comprising:
    attaching a mount assembly comprising a cover to a structure;
    supporting a pivot assembly with the mount assembly, wherein the pivot assembly comprises a gear mechanically coupled to an adaptor, wherein a spacer is positioned between the adaptor and the gear, the adaptor supported by the cover to allow the adaptor to rotate about a rotational center of the gear; and
    mechanically coupling the pivot assembly to a drive assembly comprising a drive element mechanically coupled to a worm gear, the worm gear mechanically coupled to the gear such that a drive of the drive element causes the pivot assembly to pivot the navigation light to at least one of: an operating position, a service position, or a hold position.

12. The method of claim 11, wherein the hold position is between about 90 degrees and about 180 degrees from a horizontal surface of the structure.

13. The method of claim 11, further comprising providing a counterclockwise drive to the drive element to pivot the navigation light to the at least one of the service position or the hold position, and providing a clockwise drive to the drive element to pivot the navigation light to the operating position.

14. The method of claim 11, further comprising providing a clockwise drive to the drive element to pivot the navigation light to the at least one of the service position or the hold position, and providing a counterclockwise drive to the drive element to pivot the navigation light to the operating position.

15. The method of claim 11, further comprising enclosing the drive element in an enclosure.

* * * * *